United States Patent [19]

Becker et al.

[11] 4,403,217
[45] Sep. 6, 1983

[54] MULTIPLEXED VARISTOR-CONTROLLED LIQUID CRYSTAL DISPLAY

[75] Inventors: Charles A. Becker; Donald E. Castleberry, both of Schenectady; Mark S. Logan, Utica, all of N.Y.

[73] Assignee: General Electric Company, Schenectady, N.Y.

[21] Appl. No.: 274,849

[22] Filed: Jun. 18, 1981

[51] Int. Cl.³ .............................................. G09G 3/34
[52] U.S. Cl. .................................... 340/718; 340/783; 340/719; 340/784
[58] Field of Search ............... 340/718, 719, 784, 811, 340/783

[56] References Cited

U.S. PATENT DOCUMENTS 4,233,603 11/1980 Castleberry ........................ 340/783
4,239,346 12/1980 Lloyd ................................... 340/719

Primary Examiner—Marshall M. Curtis

Attorney, Agent, or Firm—Geoffrey H. Krauss; James C. Davis, Jr.; Marvin Snyder

[57] ABSTRACT

An improved varistor-controlled multiplexed liquid crystal display of the type having columns of front electrodes and rows of rear electrodes connected in series with combinations of varistor elements and electrical capacitances, has a capacitance of increased magnitude formed in parallel with the capacitance of the liquid crystal layer in each of the multiplicity of the display cells, for reducing capacitive crosstalk between an addressed and unaddressed cell elements of the display. The increased capacitance is provided by auxiliary data electrodes positioned below, and spaced by a thin film dielectric layer from, the reflective rear cell row electrodes of the display, and spaced from the varistor member by at least one thick film dielectric layer. A pair of thick film layers may support the row scan electrodes therebetween, or the scan electrodes may be formed between a single layer and the varistor surface.

10 Claims, 7 Drawing Figures

MULTIPLEXED VARISTOR-CONTROLLED LIQUID CRYSTAL DISPLAY

BACKGROUND OF THE INVENTION

The present invention relates to multiplexed data displays and, more particular, to a novel improved multiplexed liquid crystal display utilizing varistor material for control of a multiplicity of display cells.

A multiplexed varistor-controlled liquid crystal display is described and claimed in U.S. Pat. No. 4,233,603, issued Nov. 11, 1980 to Donald E. Castleberry, assigned to the assignee of the present invention and incorporated herein in its entirety by reference. This form of display is capable of providing multiplexing of a large multiplicity of display cells, with a multiplexing order N typically on the order of 1,000. While this display has many advantages in the data display arts, it has been determined that reduction of the amount of capacitive crosstalk, between addressed and unaddressed cells of the display, would be highly desirable. Reduced capacitance crosstalk will increase display performance by reducing the magnitude of A.C. voltages induced between the addressed and unaddressed cell elements, which induced voltages tend to partially or fully turn-on the unaddressed display cells and also tend to prevent cells in the "off" condition from completely relaxing to a non-transmissive state. Additionally, it is also highly desirable to eliminate the high-resolution layer of auxiliary data electrodes, which is required to be fabricated upon the surface of the varistor member in one embodiment of the display of the aforementioned patent; it is also desirable to provide a device construction which will seal the dielectric layers, present between the reflective rear cell electrodes and the varistor member surface, to prevent permeation of the liquid crystal material into the dielectric layers with subsequent deterioration of multiplexed display performance.

BRIEF SUMMARY OF THE INVENTION

In accordance with the invention, an improved multiplexed varistor-controlled liquid crystal display, of the type having a plurality of column electrodes arrayed at the front of a liquid crystal layer and having an array of a plurality of reflective rear cell electrodes adjacent to the liquid crystal layer, with the rear cell electrodes connected to positions on the surface of a member of an electrically non-linear resistance material, utilizes a plurality of auxiliary data (column) electrodes each disposed between a row of rear cell electrodes, associated with a particular column data electrode, and the non-linear material member. The volume between the row of rear cell electrodes and the associated auxiliary data electrode is filled with a thin film of a dielectric material, whereby a capacitance is formed between each auxiliary data electrode and the adjacent plurality of rear cell row electrodes, which capacitance is electrically parallel connected with the capacitance of the liquid crystal material forming each display cell element, and provides a 10-50 times increase in display element shunt capacitance, to reduce capacitive crosstalk.

In one presently preferred embodiment, the auxiliary data electrodes are themselves spaced from the non-linear material member surface by a pair of thick-film dielectric layers. The row scan electrodes are placed at the interface of these layers.

In another presently preferred embodiment, a single thick-film dielectric layer supports the auxiliary data electrodes, with the row scan and control electrodes being fabricated directly on, or into, the non-linear material member.

Accordingly, it is one object of the present invention to provide an improved varistor-controlled multiplexible liquid crystal display.

This and other objects of the invention will become apparent upon consideration of the following detailed description, when read in conjunction with the drawings.

DETAILED DESCRIPTION OF THE INVENTION

Figure 1:
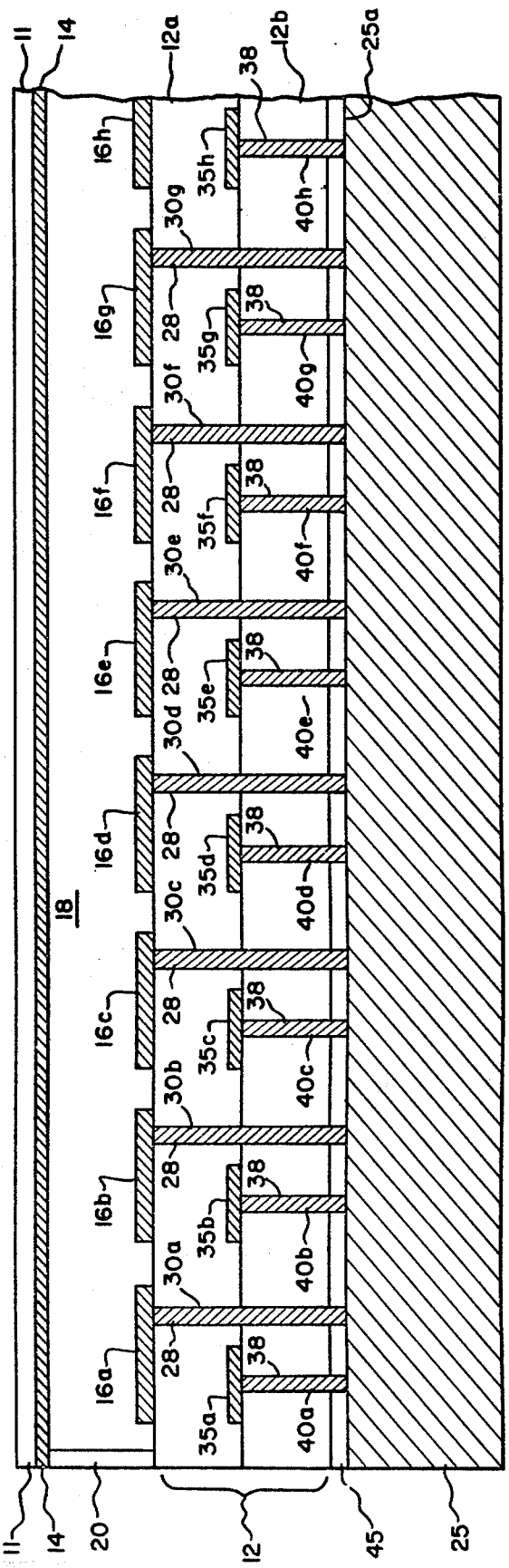
FIG. 1 is a sectional sideview of a portion of the prior art multiplexed varistor-controlled liquid crystal display.

Referring initially to FIG. 1, the prior art embodiment 10, as described with respect to FIGS. 5a and 5b of the aforementioned U.S. Pat. No. 4,233,603, has a transparent front substrate 11, typically formed of glass and the like, on the interior surface of which is fabricated a plurality of co-planar column electrodes 14, in spaced side-by-side relationship. A rear substrate 12 supports another plurality of co-planar electrodes 16, of substantially square or rectangular shape and having reflective surfaces. Electrodes 14 and 16 are arranged upon opposite sides of a layer 18 of liquid crystal material. The rear cell electrodes 16 are arranged in a rectangular matrix, with electrodes 16a–16h each being in a different row and, as illustrated, being spaced from the same associated column electrode 14. Means 20 is utilized to space the electrode-bearing substrates 11 and 12 and to seal liquid crystal material 18 within the display 10. A member 25 of a non-linear electrically resistive material, such as a ZnO varistor material (which includes, but is not limited to, the materials described and claimed in co-pending application Ser. No. 233,423 filed Feb. 11, 1981, assigned to the assignee of the present invention and incorporated herein by reference) and the like, is positioned below the rear cell electrode plane and is spaced from rear cell electrodes 16 by rear substrate 12. A plurality of apertures 28 are formed through rear substrate 12 to allow an associated one of conductive posts 30a–30g to connect an individual one of rear cell electrodes 16, e.g. one of electrodes 16a–16g, to the non-linear material surface 25a. Rear substrate 12 is formed of a pair of substrate portions 12a and 12b, such that a plurality of co-planar row scan electrodes 35, e.g.

electrodes 35a–35h may be fabricated upon the surface of that substrate portion 12b closest to material 25. A row scan electrode lies beneath the entire row of a plurality of rear cell electrodes, in a direction (into and out of the plane of the drawing) substantially perpendicular to the direction in which column electrodes 14 extend. An additional plurality of apertures 38, previously formed through the second substrate portion 12b, allow conductive posts 40, e.g. posts 40a–40h, to connect the associated row scan electrodes 35a–35h to member surface 25a, at locations spaced from the locations at which conductive posts 30a–30g contact the member surface. An auxiliary data electrode 45 is fabricated upon member surface 25a, parallel to each data column electrode 14 and in connection (not shown) thereto; auxiliary data electrode 45 is spaced from both conductive members 30 and 40 utilized for connecting member surface 25a to the row scan electrode 35 and to the rear cell electrode 16 associated with each of the cells in the display matrix.

Figure 1A:
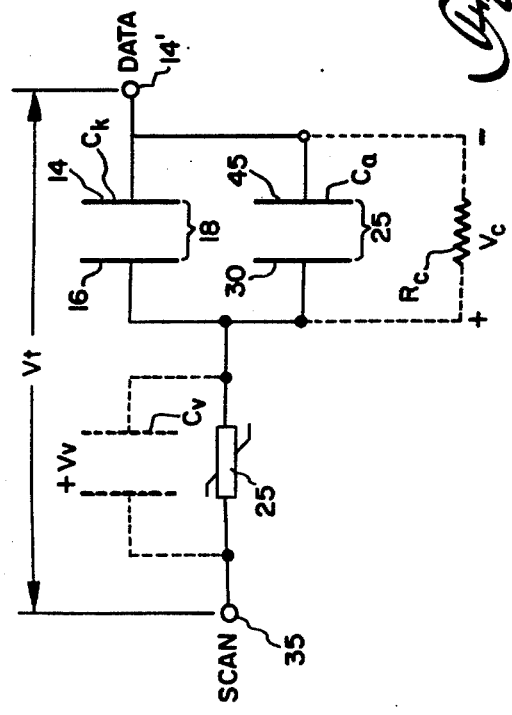
FIG. 1a is a schematic representation of the equivalent circuit of each of the multiplicity of display cells in the display matrix of the display of FIG. 1.

The storage mechanism, allowing multiplexing orders N between about 100 and 1000, is illustrated in FIG. 1a, in which a typical display cell is shown in schematic fashion. Each display cell includes a non-linear element formed of a portion of the varistor layer 25; this element is connected at one end to an associated row scan electrode 35. At the opposite end, the non-linear varistor element 25 is connected to the rear cell electrode 16 of the particular cell. There is a varistor capacitance $C_v$ formed across non-linear element 25, across which a voltage $V_v$ is stored. The dielectric liquid crystal layer 18 forms an additional capacitance $C_k$, between column electrode 14 (connected to a data driving terminal 14') and the associated rear cell electrode 16. An additional capacitance $C_a$, formed by the capacitance coupling between additional data electrode 45 and conductive posts 30 through the high-dielectric-constant material of substrate 25, is in electrical parallel connection with cell capacitance $C_k$. The relatively high resistance of the dielectric material 18 between data column electrode 14 and rear cell electrode 16, provides a discharge resistance $R_c$, in parallel with capacitances $C_k$ and $C_a$. A cell voltage $V_c$ appears between column electrode 14 and rear cell electrode 16, in series with the varistor voltage $V_v$, to yield a total voltage $V_t$ across an entire display cell, between column electrode 14 and scan electrode 35.

As more fully explained in the above-identified patent, if the total voltage $V_t$ is less than the sum of the varistor breakdown $V_b$ and the threshold voltage $V_{th}$ of the cell, the cell has minimum transmissivity and appears in the dark, or "off", condition. If the total voltage $V_t$ exceeds the sum of the varistor breakdown voltage $V_b$ and the cell threshold voltage $V_{th}$, the varistor conducts and the liquid crystal cell is in the "on" condition with high transmissivity. In this condition, entering light passes through the cell, is reflected at the surface of rear cell electrode 16b and transmitted back through the cell, and causes that cellular portion of a display to appear in a bright condition. If, after the display cell is "turned on", the total voltage $V_t$ is reduced, by either reducing the column electrode driving voltage or the scan row electrode driving voltage, the varistor no longer conducts; the liquid crystal display cell capacitance $C_k$ remains charged and maintains the liquid crystal display cell in the "on" condition. Both the liquid crystal and varistor materials have a finite leakage resistance, whereby the liquid crystal cell leakage resistance $R_c$ tends to discharge liquid crystal capacitance $C_k$ and additional capacitance $C_a$, to eventually cause the voltage across the cell to decrease to less than the voltage necessary to keep the cell in the high transmissivity condition. The cell thus returns to the "off" condition with a storage time on the order of 10 milli-seconds, whereby the display must be refreshed once in every 10 millisecond time interval. A multiplex order N of about 1,000 is therefore possible.

In the embodiment of FIG. 1, capacitance crosstalk can exist between an addressed cell (i.e. a cell to which is applied both row scan and column data voltages) and an unaddressed cell (i.e. a cell to which is applied only one, or neither, of the column data and row scan voltages), causing the unaddressed display cell to partially or fully turn "on" and/or preventing "off" cells from completely relaxing to a non-transmissive condition. While the magnitude of this capacitive crosstalk is somewhat reduced by the additional capacitance $C_a$ provided by use of additional data electrodes 45, this auxiliary capacitance has a constant ratio of the effective varistor capacitance $C_v$ and is reduced as the area of each cell (being substantially the area of the rear cell electrode 16) is reduced, when higher resolution displays are attempted.

Figure 2:
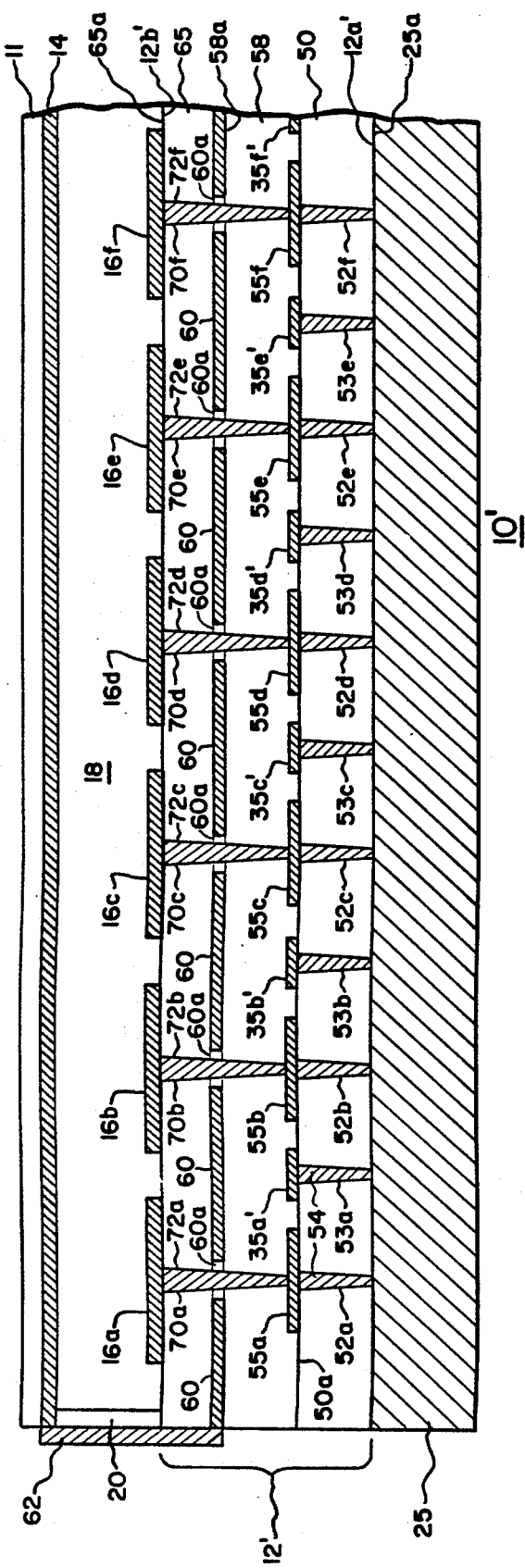
FIG. 2 is a sectional sideview of a portion of one embodiment of an improved display, in accordance with the principles of the present invention.
Figure 2A:
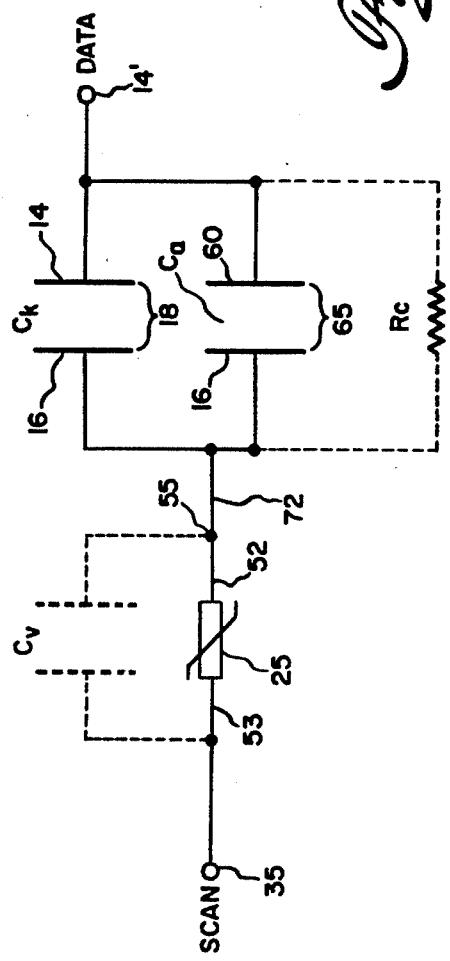
FIG. 2a is a schematic representation of the equivalent circuit of each of the multiplicity of display cells in the matrix of the display of FIG. 2, and useful in understanding the present invention.

Referring now to FIGS. 2 and 2a, our improved multiplex varistor-controlled liquid crystal display 10' utilizes the transparent front electrode 11 supporting an array of substantially parallel, spaced column electrodes 14, typically formed of a transparent conductive material such as indium tin oxide and the like. Front substrate 11 and a rear substrate 12' define a layer 18 of liquid crystal material, retained by sealing means 20. A non-linear resistance material member 25, formed of a low-capacitance varistor material and the like, abuts the rear substrate surface 12a, opposite to that surface 12b supporting an array of reflective rear cell electrodes 16.

In accordance with the invention, the varistor member surface 25a, after being properly ground and polished to a sufficiently flat surface, has a first rear substrate sublayer 50 fabricated thereon. Sublayer 50 may be a thick film of a dielectric material and may be fabricated by a screen printing and the like techniques. After fabricating layer 50, a plurality of pairs of apertures 52 and 53 are formed therethrough, from layer surface 50a (furthest from member 25) to member surface 25a. Each cell of display 10' is defined by a pair of apertures 52 and 53. Apertures 52 may be positioned anywhere within the boundary of an individual cell of the display matrix; the apertures 52 are illustratively substantially at the center of a cell. Apertures 52 define the cell-to-cell spacing of the display; the distance between aperture 52 and aperture 53 determines the extent of each cell, as minimum overlap of electrodes 16 and 35 is desired to reduce the resulting addition to capacitance $C_v$. Apertures 52 and 53 may be of any desired shape, e.g. cylindrical or conical bores, typically of one milli-inch to three milli-inch maximum diameter, as may be formed by drilling through layer 50 with a laser trimming device, or may be formed by a photolithographic process, using a photosensitive thick film material, such as the FODEL series of materials available from DuPont and the like, for layer 50, with subsequent exposure and development as is known to the art.

After formation of apertures 52 and 53, these apertures are filled with conductive material 54, typically at the same time as row scan electrodes 35 and auxiliary rear cell conductive pads 55 are fabricated upon rear substrate portion surface 50a. Each of co-planar row scan electrodes 35, e.g. row scan electrodes 35a'-35e', is an elongated electrode running (into and out of the plan of the drawing) from one edge of the display to the other, in a direction substantially parallel to the elongated direction of column electrodes 14. Each auxiliary conductive pad 55, e.g. conductive pads 55a-55f, is co-planar with, but isolated from, all other auxiliary conductive pads 55 and is of an area limited and positioned to be totally within the boundary of the associated display cell. After scan electrodes 35 and auxiliary conductive pads 55 are fabricated, e.g. of a silver thick-film material and the like, a second thick-film layer 58 of dielectric material is fabricated upon first layer surface 50a. This second layer 58 may also be applied by screen printing and the like processes, and after firing, the top surface 58a thereof may be lapped and/or polished to provide a flat surface. A plurality of co-planar auxiliary data electrodes 60 are now fabricated upon second layer surface 58a; each auxiliary data electrode 60 is substantially parallel to an associated one of the plurality of data electrodes 14, and is substantially perpendicular to the elongated direction of row scan electrodes 35. The auxiliary data electrodes may be formed by evaporation of a conductive material on the smooth dielectric layer surface 58a, and each has a plurality of apertures 60a formed therethrough. Each aperture 60a is located within the boundary, e.g. substantially at the center, of one of the multiplicity of arrayed cells which will form display 10'. It should be understood that, upon completion of display fabrication, each auxiliary data electrodes 60 will be connected, as by the conductive connections 62, to that one of the plurality of data electrodes 14 associated therewith.

A thin-film dielectric layer 65 is fabricated upon second layer surface 58a and over auxiliary data electrodes 60. Thin-film layer 65 may have a thickness of at least one order of magnitude less than the total thickness of the thick-film layer, or layers forming rear substrate 12'. Thin-film layer 65 may be fabricated by sputtering, vacuum evaporation or the like processes. The layer surface 65a, furthest from member 25, forms the rear substrate surface 12b' which will eventually support co-planar rear cell electrodes 16.

A plurality of apertures 70 are formed from layer surface 65a', sequentially through layer 65, an underlying auxiliary data electrode aperture 60a and second layer 58, to an associated one of conductive pads 55. The diameter of apertures 70, at the plane of second layer surface 58a, is less than the diameter of auxiliary data electrode apertures 60a, with the location of apertures 70 being closely controlled, whereby each aperture 70 can contain a conductive material member 72 electrically isolated from the adjacent auxiliary data electrode 60. Aperture 70a may be formed by laser evaporation of the dielectric materials of layers 65 and 58, or by photolithographic etching, if layers 65 and 58 are fabricated of photosensitive materials. Advantageously, aperture 70 will be formed as laser-drilled holes, with the laser drilling equipment being of the numerically-controlled type, whereby software control can be exercised such that a high degree of registration is provided, especially when the same drilling locations are utilized for drilling both sets of apertures 52 and 70 in which conductive members 54 and 72 are subsequently formed. After the fabrications of apertures 70, the conductive rear cell electrodes 16 and interconnecting conductive members 72 are fabricated, as by evaporation of a thin-film metallic material through an evaporation mask, or by evaporation of a continuous metal film, followed by photolithographic etching to provide the attached electrode 16. Alternatively, the appropriate portion of each aperture 70 can be formed through layer 58 and filled with conductive material 72, before electrodes 60 and thin layer 65 are fabricated; the remainder of aperture 70 is then drilled within aperatures 60a, through layer 65 and so filled, with the conductive material utilized to fabricate electrodes 16, as to be in electrical contact with the previously-formed lower portion of 72 post.

Each rear cell electrode 16 e.g. rear cell electrode 16a, will be of square, substantially rectangular or other select geometric shape, and is integrally connected through a conductive member 72a to the auxiliary conductive pad 55a, which is itself integrally connected through its associated conductive member 52a to a particular location upon the varistor member surface 25a. The associate row electrode, e.g. row scan electrode 35a' is integrally connected through a member 53, e.g. conductive member 53a, to a location on varistor member surface 25a, adjacent to the location of conductive member 52a.

It will be seen that, in addition to the relatively low varistor capacitance $C_V$, and the cell liquid crystal layer capacitance $C_k$, which are substantially the same as the varistor and cell capacitances in the prior art embodiments, the additional capacitance $C_a$ formed between rear cell electrode 16 and auxiliary data electrode 60 is increased, typically between about 10 and 50 times over the prior art additional capacitance magnitude, because the auxiliary data electrode can now occupy a greater percentage of the area of a cell electrode 16 (as the auxiliary data electrode plane is now on a different plane from that occupied by the connection of members 52 and 53 to the varistor surface) and because of the relatively smaller spacing (the thickness of thin-film layer 65) between each auxiliary data electrode 60 and each rear cell electrode 16. Further, because the prior art auxiliary electrode was upon the varistor surface, that electrode required much higher resolution than the remaining electrodes, to avoid affecting the varistor switch breakdown field. In the improved embodiment of FIG. 2, auxiliary data electrodes 60 are removed from the varistor layer surface and have approximately the same resolution requirements as the remainder of the electrode planes, whereby matrix display 10' can be more consistently fabricated. Further, the dielectric material of layer 65 can be selected to provide a seal between liquid crystal layer 18 and the thick-film dielectric materials of layers 58 and 50, thus preventing permeation of the liquid crystal material into the dielectric thick-film layers.

Figure 3:
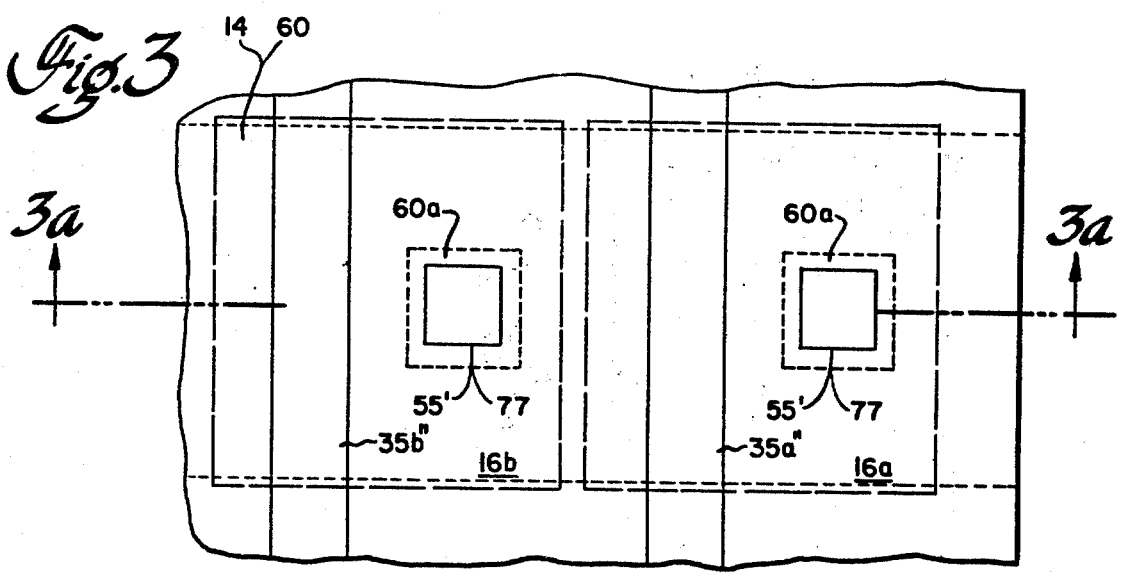
FIG. 3 is a plan view into a portion of another embodiment of an improved display, in accordance with the principles of the present invention.
Figure 3A:
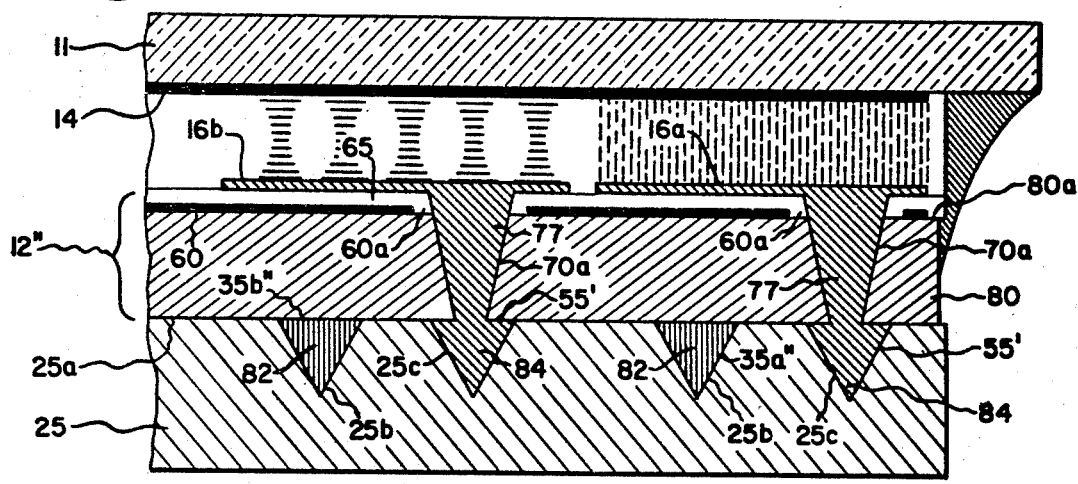
FIGS. 3a and 3b are alternative sectional views through portions of the display of FIG. 3, taken along lines A—A.
Figure 3B:
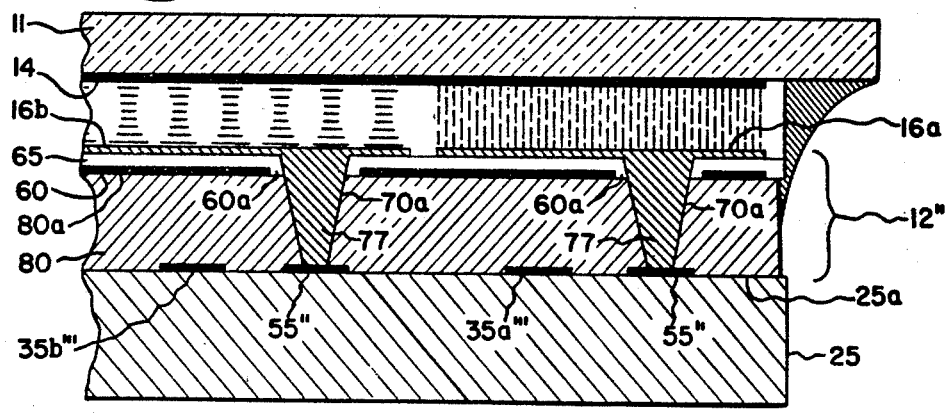

Referring now to FIGS. 3, 3a and 3b, other presently preferred embodiments of display 10a provide for simplified manufacture and require the use of a single thick film dielectric layer 80, rather than a pair of thick-film dielectric layers, as part of rear substrate 12''. The row scan electrodes 35 and co-planar cell conductive pads 55 are now positioned into, or upon the surface of, the varistor member 25 (FIGS. 3a and 3b, respectively). Thus, in the embodiment of FIG. 3a, laser machining, as more fully described and claimed in co-pending application Ser. No. 249,599, filed Apr. 1, 1981, assigned by the assignee of the present invention and incorporated herein in its entirety by reference, is utilized to form each of a plurality of grooves 25b (which may be of substantially triangular cross-section) through varistor member surface 25a and into the thickness of the member. Each of the grooves is filled with a conductive material deposit 82 to form each of a plurality of elongated row scan electrodes 35'', e.g. scan electrode 35a'' or 35b''. Within a portion of the varistor member surface area, in registration with each rear cell electrode 16, a hole 25c is formed into the varistor material member through the surface 25a thereof. Each hole 25c is filled with conductive material deposits 84 and forms a control electrode, having the associated conductive pad 55' (for that particular cell) defined at the surface thereof. After fabrication of electrodes 35'' and pads 55', the single thick film dielectric layer 80 is fabricated. Alternatively, the row scan electrodes 35''' and auxiliary conductive pads 55'' may be fabricated as thin film electrodes directly upon varistor member surface 25a (FIG. 3b). After fabrication of these thin film co-planar electrode formations, single layer 80 is fabricated upon the varistor surface, and covers the electrodes. In either embodiment, the auxiliary data electrodes 60 (including the apertures 60a) are fabricated upon the dielectric layer surface 80a. The thin film dielectric layer 65 is then fabricated. Apertures 70a are machined through all of layer 65, the auxiliary data electrode apertures 60a and single thick film dielectric layer 80, to the surface of conductive pads 55' or 55'', in either a single step, or in a two-step procedure as described hereinabove. Each aperture 70 is filled with conductive material to provide a conductive member 77 integrally joining each rear cell electrode 16 to the associated conductive pad 55' or 55''. These embodiments will advantageously provide decreased display complexity with an increase in achievable display uniformity, due to the high resolution with which the row scan electrodes and conductive pad formations can be formulated upon, or into, the varistor member surface, but may, if single dielectric layer 80 is not thick enough, to provide additional and unwanted capacitance between the various electrodes, particularly those formed into, or on the surface of, the varistor member.

While several presently preferred embodiment of our improved multiplex varistor-controlled liquid crystal display have been described in detail herein, many modifications and variations will now occur to those skilled in the art. For example, connection of data signals and scan signals respectively to the respective row and column electrodes can be equally as well used, dependent upon the desired end utilization of a particular display. It is our intent, therefore, to be limited only by the scope of the appending claims and not by exemplary details disclosed for these embodiments.

What is claimed is:

1. In a multiplexible matrix display of the type having a plurality of substantially parallel and transparent column electrodes elongated in a first direction in a first plane; a plurality of co-planar rear cell electrodes arranged in a matrix which extends in both the first direction and in a second direction, substantially perpendicular to the first direction, in a second plane parallel to and spaced behind the first plane; a plurality of substantially parallel row electrodes extending in the second direction and with only one of the row electrodes associated with each row in the second direction of the rear cell electrodes; a member of a non-linear material positioned substantially parallel to said first and second planes and having a matrix of positions defined thereon, with each position forming a non-linear resistance element in correspondence to each of the multiplicity of display cells each defined by one of the rear cell electrodes in said matrix, said non-linear material having a preselected break-down voltage below which break-down voltage substantially no current flows through said material and above which break-down voltage substantial amounts of current can flow therethrough and with a voltage drop across said member being substantially equal to said break-down voltage; means for coupling each matrix position of the member between that one of the rear cell electrodes defining a particular matrix cell and the row electrode associated with that matrix cell; a layer of optically-active material positioned between the first and second planes and having a matrix of display cells each defined therein by the registration of one of the column electrodes and one of the rear cell electrodes and with the optically-active material respectively absorbing and transmitting light entering each cell responsive to the magnitude of the voltage between the portions of the column and rear cell electrodes defining that cell being respectively less than and at least equal to a preselected voltage magnitude, so that each matrix cell absorbs light incident thereon if the magnitude of a total driving voltage coupled between the column and row electrodes defining that cell is less than the sum of the break-down voltage of the non-linear material and the preselected voltage magnitude for the optically-active material layer and with each matrix cell reflecting light incident thereon if the magnitude of the total driving voltage is greater than the sum of said break-down voltage and the preselected voltage magnitude of the optically active material layer; and a plurality of auxiliary electrodes arranged spaced each from the other in the first direction and each in registration with and electrically connected to an associated column electrode, the improvement comprising:
    the plurality of auxiliary electrodes being spaced from the member of non-linear material;
    at least one thick-film dielectric layer interposed, with a first thickness, between the plurality of auxiliary electrodes and the non-linear material member; and
    a thin-film dielectric layer interposed between the plurality of auxiliary electrodes and all of the associated rear cell electrodes and providing each of a plurality of individual capacitances between each individual one of the auxiliary electrodes and each of the rear cell electrodes associated with that individual auxiliary electrode.

2. The improved display of claim 1, wherein the plurality of auxiliary electrodes are co-planar in a third plane substantially parallel to said second plane.

3. The improved display of claim 2, wherein a single thick-film dielectric layer is interposed between the third plane of said auxiliary electrodes and said non-linear material member.

4. The improved display of claim 3, wherein each of said row electrodes is a thin-film electrode fabricated upon a surface of said material member closest to said rear cell electrodes; and further including a plurality of thin-film control electrodes fabricated upon said member surface, with each of said control electrodes being associated with one of the plurality of rear cell electrodes; and said matrix position coupling means includes a conductive member extending between, and electrically connecting, one of the rear cell electrodes and the associated one of said thin-film control electrodes.

5. The improved display of claim 4, wherein each auxiliary electrode has a plurality of apertures formed therethrough, each in registration with one of the associated row of rear cell electrodes; the conductive member from a particular rear cell electrode extending through an associated auxiliary electrode aperture to an associated control electrode.

6. The improved display of claim 3, wherein each row electrode is fabricated into the material member through a surface thereof closest to said rear cell electrode; and further comprising a plurality of conductive pads fabricated into the member, through said surface thereof, each in a position associated with one of the rear cell electrodes and adjacent to, but insulated from, the associated row electrode; and said matrix position coupling means includes a plurality of conductive members, each extending between one of the rear cell electrodes and an associated one of said plurality of conductive pads.

7. The improved display of claim 6, wherein each auxiliary electrode has a plurality of apertures formed therethrough each in registration with one of the associated rear cell electrodes; each conductive member extending through an associated auxiliary electrode aperture, between the associated rear cell electrode and conductive pad.

8. The improved display of claim 2, wherein first and second thick-film dielectric layers are sequentially fabricated between said non-linear material member and said third plane occupied by the plurality of auxiliary electrodes; the interface between said first and second dielectric layers forming a fourth plane in which the plurality of row electrodes are substantially situated.

9. The improved display of claim 8, wherein the matrix position coupling means comprises: means for conductively connecting each row electrode to the non-linear material member; and means for conductively connecting the material member to an associated rear cell electrode.

10. The improved display of claim 9, wherein each auxiliary electrode has a plurality of apertures formed therethrough, each in registration with one of the plurality of rear cell electrodes; each of the means connected the non-linear material member to an associated row electrode extending through an associated auxiliary electrode aperture.

* * * * *